Nov. 19, 1946.                S. ROBERTS                 2,411,338
                              WAVE GUIDE
                           Filed July 24, 1944
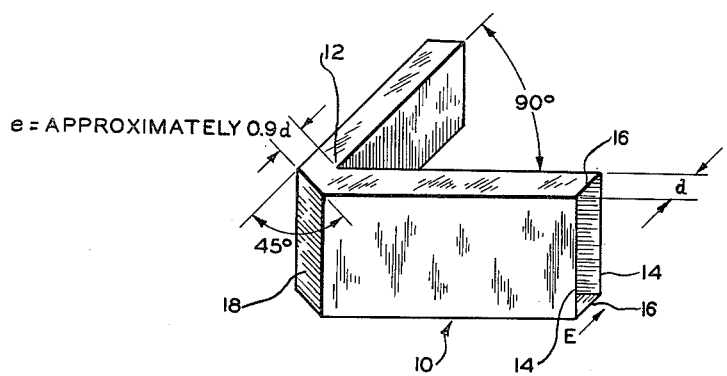
*INVENTOR.*
SHEPARD ROBERTS
BY
ATTORNEY Patented Nov. 19, 1946

2,411,338

UNITED STATES PATENT OFFICE 2,411,338

WAVE GUIDE

Shepard Roberts, Cambridge, Mass., assignor, by mesne assignments, to the Government of the United States of America, as represented by the Secretary of War Application July 24, 1944, Serial No. 546,420

2 Claims. (Cl. 178—44)

The present invention relates to wave guides for conveying high frequency electrical energy, and more particularly, to means for providing directional changes in such wave guides, of the order of a right angle.

It is known that wave guides may be provided with gradual changes in direction over any desired angle without causing appreciable loss in efficiency of transmission, and at present, direction changing in wave guide energy conductors is provided by bending such conductors uniformly on relatively long radii, preferably greater than twice the wave length of the energy to be transmitted in each case. Angle elements of this type are known as circumferential bends, and are not adapted to space limitations in many instances imposed by associated circuit elements.

Modification of such bends to meet space limitations and a requirement for wide angle changes in direction serve to introduce undesired transmission characteristics, such as excessive wave reflection, and therefore generally are not practical.

Accordingly, it is an object of this invention to provide an improved direction changing or angle element for a wave guide which is not subject to the limitations above referred to.

It is also an object of the present invention to provide an improved section in a wave guide for a right angle bend which introduces a minimum of wave reflection, and eliminates the usual circumferential curve and the length of conductor involved therein.

It is a further object of the invention to provide, in a wave guide, angle elements which eliminate circumferential bends and may be of the order of ninety degrees without undue wave reflection in operation.

It is another object of the invention to provide a bend element in a rectangular wave guide adapted to transmit electromagnetic energy from one portion of the guide to another portion of the guide around a right angle while maintaining the original electromagnetic field pattern.

The invention will further be described and understood with reference to the accompanying drawing illustrating a present preferred embodiment thereof, and its scope will be pointed out in the appended claims.

In the drawing, the single figure is a perspective view of a right angle bend in the E vector plane for a wave guide made in accordance with the principles of the present invention.

Referring now more in detail to said drawing, the numeral 10 designates a wave guide of the tubular type, of rectangular cross section, provided with a right angle, or ninety degree bend, indicated at 12, and comprising spaced wide side walls 14 and top and bottom narrow walls 16 joining the edges of the side walls.

The inner corner of the bend may be relatively sharp as indicated, and comprise a right angle junction of the inner side walls of the guide.

The outer corner of the bend may be provided by a wall member 18, disposed at an angle of substantially forty-five degrees to the outer side walls of the guide, and spaced from the inner corner of the bend by a distance $e$, said distance being substantially nine-tenths the width $d$ of the guide for maximum power transmission around the bend. The member 18 provides a reflecting wall at the outer corner of the bend disposed at equal angles to the side walls of the guide. It will be seen that the wave guide element may be considered to comprise the right angle junction of the inner side walls of the guide at the inner side of the bend, and a reflecting wall extending between forming a continuation of the outer side walls of the guide opposite said junction, said wall being disposed at the outer side of the bend and at substantially a 45° angle to the last named walls. It will further be seen that this type of angle is relatively sharp and is, therefore, adapted to limited space in high frequency apparatus without introducing appreciable loss in the transmission of energy. It has been found to be highly efficient in operation and readily applicable to changes in direction in either the magnetic or (H) vector plane, or the electrostatic or E vector plane, as shown.

The present invention provides a short right angle bend for wave guides which entirely obviates the use of the long circumferential bend heretofore employed, and results in a considerable saving of space in high frequency equipment. The bend provides conduction of energy from one portion of the guide to another portion of the guide around a right angle while maintaining the original electromagnetic field pattern.

What is claimed is:

1. A wave guide for transmitting electromagnetic energy around a right angle, said guide comprising two portions of rectangular wave guide disposed at substantially a right angle to each other, each portion having spaced parallel side walls and spaced parallel walls perpendicular thereto and connecting said side walls to enclose a space of rectangular cross-section, a pair of corresponding side walls of the two portions intersecting and being joined at substantially a right angle to form an inner bend corner, and means for changing the direction of energy within said guide, said means consisting of a reflecting wall joining the other pair of corresponding side walls and forming an outer bend corner, said reflecting wall being disposed at angles of substantially forty-five degrees with each associated side wall, said reflecting wall being spaced from said inner bend corner by a distance substantially nine-tenths of the perpendicular distance between the spaced side walls, whereby electromagnetic energy within said guide will be transmitted from one guide portion to the other guide portion around a right angle bend while maintaining its original electromagnetic field pattern.

2. A wave guide for transmitting electromagnetic energy around a right angle, said guide comprising two portions of rectangular wave guide disposed at substantially a right angle to each other, each portion having spaced parallel wide side walls and spaced parallel narrow walls perpendicular thereto and connecting said wide side walls to enclose a space of rectangular cross-section, a pair of corresponding wide side walls of the two portions intersecting and being joined at substantially a right angle to form an inner bend corner, and means for changing the direction of energy within said guide, said means consisting of a reflecting wall joining the other pair of corresponding wide side walls and forming an outer bend corner, said reflecting wall being disposed at angles of substantially forty-five degrees with each associated wide side wall, said reflecting wall being spaced from said inner bend corner by a distance substantially nine-tenths of the perpendicular distance between the spaced wide side walls, whereby electromagnetic energy within said guide will be transmitted from one guide portion to the other guide portion around a right angle bend in its E vector plane while maintaining its original electromagnetic field pattern.

SHEPARD ROBERTS.